Sept. 15, 1925.
C. GIRL
AUTOMOBILE BUMPER
Filed Jan. 16, 1922
1,554,000
2 Sheets-Sheet 1
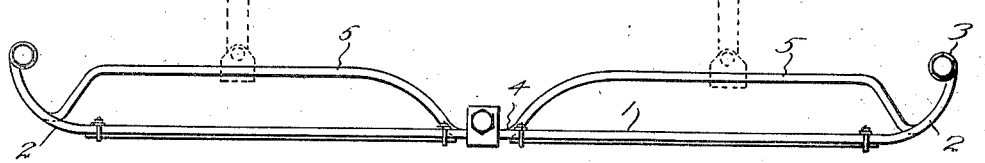
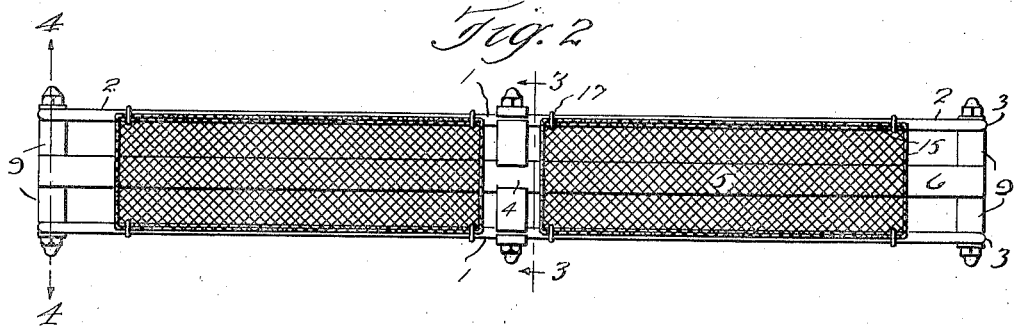
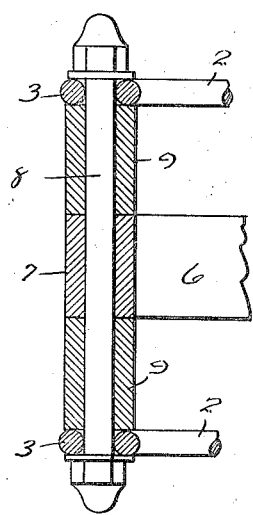
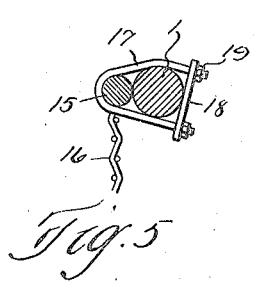
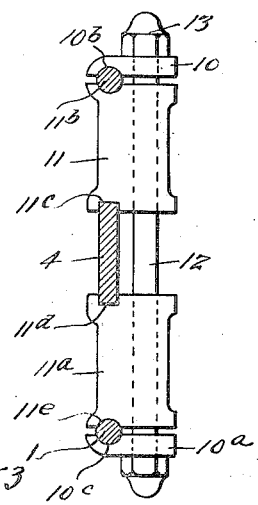
Inventor
Christian Girl,
By Hull, Brock West,
Attys.

Sept. 15, 1925.                                                       1,554,000
C. GIRL
AUTOMOBILE BUMPER
Filed Jan. 16, 1922                             2 Sheets-Sheet 2
Fig. 6
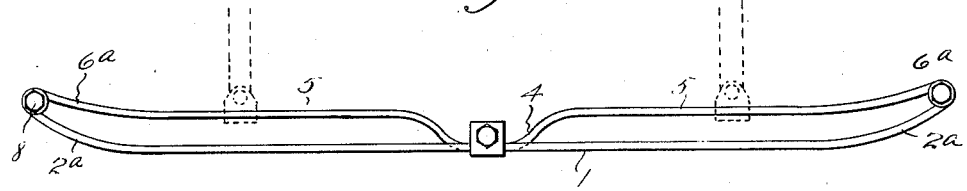
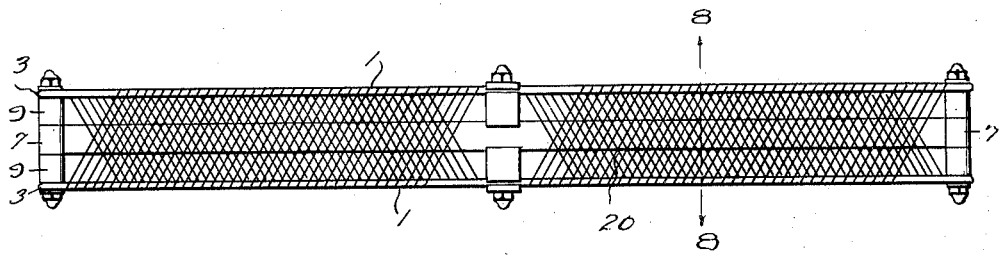
Fig. 7
Fig. 8
Inventor
Christian Girl,
By Hull, Brock & West,
Attys.

Patented Sept. 15, 1925.

1,554,000

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed January 16, 1922. Serial No. 529,653.

*To all whom it may concern:*

Be it known that I, CHRISTIAN GIRL, a citizen of the United States, residing at Kalamazoo, in the county of Kalamazoo and State of Michigan, have invented a certain new and useful Improvement in Automobile Bumpers, of which the following is a full, clear, and exact description, reference being had to the accompanying drawings.

This invention relates to automobile bumpers and has for its general object to provide a bumper of this character which will perform in an efficient manner all of the functions and duties required of such bumpers. More limitedly, the object of the invention is to provide an efficient form of bumper having a widened front or impact section; also, to provide a bumper of this character with a protecting metallic net work, which net work may further be conveniently applied to and removed from the cooperating parts of the bumper. The foregoing objects, and others which will be referred to in detail hereinafter, will be realized in and through the construction and arrangement of the parts shown in the drawings forming part hereof, wherein Fig. 1 represents a plan view of a bumper embodying my invention, indicating the manner in which the same is supported from the side members of an automobile; Fig. 2, a front elevation of the bumper shown in Fig. 1; Figs. 3 and 4 details in section corresponding respectively to the lines 3—3 and 4—4 of Fig. 2; and Fig. 5 a detail in section showing the manner of fastening the screen frames to the bumper; Figs. 6 and 7 are views similar to Figs. 1 and 2, respectively, showing a modification of my invention; and Fig. 8 a detail in section corresponding to the line 8—8 of Fig. 7.

Describing by reference characters the various parts illustrated, and with particular reference to Figs. 1-5 inclusive, 1, 1 denote a pair of front or impact bars, the same being preferably of round rod construction and being parallel to each other throughout their length and extending substantially the full length of the bumper. At their end portions, the rods are curved sharply rearwardly, as shown at 2, and each is provided at its extreme ends with eyes 3.

Cooperating with the bars 1, 1, is a rear bar, the same being preferably a flat spring plate. This rear bar comprises a central portion 4 which is bent forwardly into vertical alignment with the central portions of the rods 1, intermediate portions 5 spaced rearwardly from the central portion and extending substantially parallel with the corresponding portions of the front bars or rods, and curved end portions 6 interposed between and conforming to the curvature of the end portions 2 of the front bar, whereby the end portions of all three bars are in the same curvilinear plane at each end of the bumper. Each of the extreme ends of the rear bar or plate is provided with an eye 7. This manner of constructing the ends of the rear bar not only contributes to the sightly appearance of the bumper, but provides at the extreme ends thereof impact receiving portions comprising all three of the bars.

The eyes 3 and 7 at each end of the bumper are connected by a bolt 8, spacing sleeves 9 being interposed between the eye on the central plate 6 and the eyes 3 on the rods 2.

For the purpose of securing the central portion 4 of the rear bar to the corresponding portions of the front bar, clamps such as shown in detail in Fig. 3 may be employed. This clamp comprises an upper member 10 and a lower member 10$^a$, each having a rounded recessed seat 10$^b$, 10$^c$, therein, respectively, for engagement with the upper and lower surfaces of the upper and lower bars 1, respectively. In addition, the clamp comprises an upper and a lower intermediate sleeve member 11, 11$^a$, each provided at its opposite ends with a rounded recessed seat, indicated at 11$^b$ and 11$^c$ in the member 11 and at 11$^d$ and 11$^e$ in the member 11$^a$, the seats 11$^b$ and 11$^c$ cooperating respectively with the upper and lower surfaces of the upper and lower members 1 and the seats 11$^c$ and 11$^d$ cooperating with the upper and lower surfaces of the rear bar 4, 5, respectively. The clamping members are perforated for the reception of a bolt 12 having a nut 13 thereon for securing the various members together upon the bars 1, 1 and 4. The bumper will be connected to the vehicle side frames in any convenient manner, as by means of arms, indicated conventionally at 14 in Fig. 1.

The front or impact portion of the bumper is provided with a detachable net work. This net work consists of two rectangular frames 15, each of a length to extend from the central portion of the bumper as far as the curved ends 2 of the front bars thereof and each being of a width to permit its upper and lower frame members to be conveniently secured to the rods 2. Each rectangular frame is conveniently formed of round rod stock to which a heavy wire netting 16, preferably of spring steel, is secured, and the frames are conveniently secured to the rods 1, 1, by means of clips or clevises each comprising a U-bolt 17 extending around the front of the frame and the cooperating rod 1, the rear ends of the bolts projecting through cross plates 18 and being provided with nuts 19. As shown more particularly in Fig. 5, the rear end of the upper part of each upper U-bolt is bent downwardly, mainly for the purposes of sightliness, bringing the tops of the clamping plates below the top of the wires 1. For like reason, the lower parts of the lower U-bolts are bent upwardly, the position of such U-bolts being the reverse of that shown in Fig. 5.

In Figs 6, 7 and 8, there is shown a modification of my invention wherein the bumper comprises a pair of round rods 1, 1, similar to the corresponding rod in Figs. 1–5. The outer ends of the rods 1 are shown as only slightly curved, as indicated at 2ª, instead of being sharply curved, as in the preceding form of my invention. The rear bar in this case is also a flat spring plate having a forwardly curved central portion interposed between the central portions of the rods 1, an intermediate portion 5 on each side of the central portion and substantially parallel with the corresponding portions of the front rods 1, 1, and end portions 6ª extending nearly parallel with the end portions 2ª. The end portions 6ª are provided with eyes 7 registering with the eyes 3 on the front bars. The ends and the central portions of the front and rear bars are connected in the same manner as is the case with the construction shown in the preceding views, and like numerals are employed to indicate these corresponding parts. In the construction shown in Figs. 6–8, the heavy wire netting is applied directly to the bars 1, as indicated in Fig. 8.

Having thus described my invention, what I claim is:

1. A bumper comprising an upper and a lower impact bar of round stock having their ends substantially parallel to each other and an intermediate rear bar of flat material having its greatest dimension in a vertical plane and having its ends interposed between the corresponding ends of the first mentioned bars, and means connecting such ends.

2. A bumper comprising a front or impact section and a rear or auxiliary section, one of said sections having an upper and a lower bar having their ends substantially parallel and the other section comprising a bar having its ends interposed between the ends of the first mentioned bars, the bar or bars of one of said sections being of round stock and the bar or bars of the other section being of flat material having its greatest dimension in a vertical plane, and means connecting the ends of said sections.

3. A bumper comprising an upper and a lower bar of round stock extending substantially the length of the bumper and each having its ends curved rearwardly and provided each with an eye, a rear bar comprising a plate having its central portion projected toward the central portions of the said front bars and having extended end portions inserted between the ends of the first mentioned bars and curved to correspond in contour with the corresponding end portions of the upper and lower bars, the end portions of the bars at each end of the bumper being in substantially the same curvilinear plane, each end of the rear bar being provided with an eye, and bolts connecting the eyes at opposite ends of the bumper.

4. A bumper comprising an upper and a lower bar extending substantially the length of the bumper and each having its ends curved rearwardly, a rear bar comprising a plate having its central portion projected toward the central portions of the said front bars and having extended end portions inserted between the ends of the first mentioned bars and curved to correspond in contour with the corresponding end portions of the upper and lower bars, the end portions of the bars at each end of the bumper being in substantially the same curvilinear plane, and means connecting the ends of the bars at opposite ends of the bumper.

5. A bumper comprising an upper and a lower impact bar arranged in substantially the same vertical plane, a net work, and means detachably securing the said net work to said bars.

6. A bumper comprising an upper and a lower impact bar arranged in substantially the same vertical plane, a net work, a frame supporting the same and comprising upper and lower bars adapted to bear against the upper and lower bars of said bumper, and means detachably connecting the bars of said frame to the bumper bars.

7. A bumper comprising an upper and a lower impact bar arranged in substantially the same vertical plane, a net work, a frame supporting the same, and means detachably securing said frame to said bars.

8. A bumper comprising an upper and a lower impact bar, a pair of frames, a net work carried by each frame, and means for securing each frame to said impact bars and on opposite sides of the central portion of the latter.

9. A bumper comprising a pair of front or impact bars, and a net work secured to said bars on each side of the central portion thereof and between such portion and an end of the bumper.

10. In a bumper, the combination of upper and lower impact bars, a frame having upper and lower members adapted to bear against the upper and lower impact bars, respectively, a net work carried by said frame, and U-bolts extending about each impact bar and the frame member corresponding thereto, the upper legs of the upper U-bolts being bent downwardly and the lower legs of the lower U-bolts being bent upwardly, and cross plates cooperating with the legs of each U-bolt and with the inner surface of the cooperating impact bar.

11. In a bumper, the combination of upper and lower impact bars arranged in substantially the same vertical plane, a frame having upper and lower members adapted to bear against the upper and lower impact bars, respectively, a net work carried by said frame, and a U-bolt extending about each impact bar and the frame member corresponding thereto.

12. A bumper comprising an upper and a lower impact bar, a pair of frames, a net work supported by each frame, and clips detachably securing each of said frames to said impact bars.

13. A bumper comprising an upper and lower bar extending substantially the length of the bumper and each having its ends curved rearwardly, a rear bar having extended end portions inserted between the ends of the first mentioned bars and curved to correspond in contour with the corresponding end portions of the upper and lower bars, the end portions of the bars at each end of the bumper being in substantially the same curvilinear plane, and means connecting the ends of the bars at opposite ends of the bumper.

In testimony whereof I hereunto affix my signature.

CHRISTIAN GIRL.